(12) United States Patent
Inoue et al.

(10) Patent No.: US 7,180,510 B2
(45) Date of Patent: Feb. 20, 2007

(54) POINTED POSITION DETECTION DEVICE AND POINTED POSITION DETECTION METHOD

(75) Inventors: Hideaki Inoue, Musashimurayama (JP); Keiichi Kobayashi, Hamura (JP)

(73) Assignee: Casio Computer Co., Ltd., Tokyo (JP)

(*) Notice: Subject to any disclaimer, the term of this patent is extended or adjusted under 35 U.S.C. 154(b) by 479 days.

(21) Appl. No.: 10/651,655

(22) Filed: Aug. 28, 2003

(65) Prior Publication Data

US 2004/0041786 A1 Mar. 4, 2004

(30) Foreign Application Priority Data

Aug. 30, 2002 (JP) .............................. 2002-252219
Aug. 11, 2003 (JP) .............................. 2003-291252

(51) Int. Cl.
*G09G 5/00* (2006.01)
*G09G 1/00* (2006.01)
*G09G 3/28* (2006.01)
*G09G 3/22* (2006.01)
*H04N 9/12* (2006.01)

(52) U.S. Cl. ...................... 345/180; 345/179; 345/182; 345/183; 348/742; 348/743

(58) Field of Classification Search ................ 345/180
See application file for complete search history.

(56) References Cited

U.S. PATENT DOCUMENTS 5,831,601 A 11/1998 Vogeley et al.
5,914,783 A * 6/1999 Barrus ........................ 356/614
6,331,848 B1 12/2001 Stove et al.
6,798,926 B2 * 9/2004 Hiramatsu .................. 382/291
7,091,949 B2 * 8/2006 Hansen ....................... 345/158
2001/0028341 A1 * 10/2001 Kitazawa .................... 345/156
2003/0222849 A1 * 12/2003 Starkweather .............. 345/156

FOREIGN PATENT DOCUMENTS

EP    0 690 409 A1    1/1998

* cited by examiner

*Primary Examiner*—Sumati Lefkowitz
*Assistant Examiner*—Alexander S. Beck
(74) *Attorney, Agent, or Firm*—Frishauf, Holtz, Goodman & Chick, P.C.

(57) ABSTRACT

A field sequential color projector includes an area sensor unit having an area sensor for photographing a screen, and an optical filter for permitting only a red light having the same color as a laser beam from a laser pointer to be input to the area sensor, and a color period/timing extraction unit which extracts timings for projecting red, green, and blue images. When a projection timing for a red image arrives while an image is projected, an MPU (Micro Processor Unit) receives a light of an image projected on the screen at that time to acquire image information, and detects a position pointed by the laser beam based on the acquired image information. Even if there exists a portion having the same color as the laser beam in the projected image, a pointed position detection device accurately detects the position irradiated by a pointing light of the laser pointer.

14 Claims, 11 Drawing Sheets

POINTED POSITION DETECTION DEVICE AND POINTED POSITION DETECTION METHOD

BACKGROUND OF THE INVENTION

1. Field of the Invention

The present invention relates to a pointed position detection device and a pointed position detection method for detecting a position irradiated by a pointing light by a laser beam from a pointer device, etc. on a projected image on a screen.

2. Description of the Related Art

Conventionally, a projector has been used for projecting an explanatory image created by, for example, a personal computer on a screen in enlargement, in a presentation for project explanation or product description, or a lecture for presenting research results, etc. As a method of projecting an image in color, there is a method called field sequential color method. The field sequential color method is a method for projecting an R image, a G image, and a B image on a screen alternately and quickly in a cycle, thereby making human eyes perceive a color image. A projector which employs an optical modulator for embedding image information output from a personal computer on a light beam, has been put into practical use, as a projector of the field sequential color method. A DMD (Digital Micromirror Device) is used as the optical modulator. Such a projector comprises a color wheel in addition to the DMD. The color wheel is a rotatable color filter which is divided into areas for R (red), G (green), and B (blue) in the rotation direction. The color wheel generates an R image, a G image, and a B image by permitting a light of a color image from a light source to permeate therethrough. The projector focuses the light of the color image from the light source onto the DMD through the color wheel while rotating the color wheel. The projector mechanically drives the DMD in synchronization with the rotation of the color wheel, and reflects the focused R image, G image, and B image on the DMD to project a projection light of each of the R, G, and B images on the screen.

In the meantime, in a case where a projector is used in a presentation, etc., it is common that the presenter or the lecturer points to an arbitrary position on the projected image on the screen by using a laser pointer and irradiating a laser beam (generally, red-colored) emitted therefrom onto the screen.

However, in a case where one tries to detect the position pointed by the laser pointer with the use of an area sensor such as a CCD, etc., there has occurred the following problem. That is, in a case where the laser beam emitted from the laser pointer is, for example, red, and the projected image on the screen includes a red portion, it is difficult to detect only the optical image of the laser beam.

SUMMARY OF THE INVENTION

A preferred embodiment of the present invention is a pointed position detection device which detects a position irradiated by a pointing light of a pointing device for specifying a position on a screen by the pointing light, and comprises:

a timing extraction unit which extracts a projection period during which an image of each of a plurality of pre-designated color components included in a projected image is projected;

a photographing unit which receives a light of an image projected together with the pointing light of the pointing device on the screen, and thus acquires image information of this projected image, in a projection period extracted by the timing extraction unit during which an image including only a color component different in color from the pointing light, among the plurality of pre-designated color components, is projected; and a position detection unit which detects the position irradiated by the pointing light from the image information acquired by the photographing unit.

Another preferred embodiment of the present invention is a method of detecting a position irradiated by a pointing light of a pointing device for specifying a position on a screen, and comprises:

a timing extracting step of extracting a projection period during which an image of each of a plurality of pre-designated color components included in a projected image is projected;

a photographing step of receiving a light of an image projected together with the pointing light of the pointing device on the screen, and thus acquiring image information of this projected image on the screen, in a projection period extracted in the timing extracting step during which an image including only a color component different in color from the pointing light, among the plurality of pre-designated color components, is projected; and a position detecting step of detecting the position irradiated by the pointing light of the pointing device from the image information acquired in the photographing step.

Yet another preferred embodiment of the present invention is a pointed position detection system including a pointing device for irradiating a pointing light onto a screen and pointing a position on a screen by the irradiated pointing light, and a pointed position detection unit for detecting the position pointed by the pointing light of the pointing device.

The pointing device comprises:

a light emitting element which emits a pointing light; and a transmission unit which transmits a radio signal synchronously with light emission of the light emitting element.

The pointed position detection unit comprises:

a reception unit which receives the radio signal from the transmission unit of the pointing device;

a stop unit which stops projection of an image having a specific color, in response to the radio signal received by the reception unit;

a photographing unit which receives a light of an image projected together with the pointing light on the screen and thus acquires image information of this projected image, in a period during which the stop unit stops projection of the image having the specific color; and a position detection unit which detects the position irradiated by the pointing light, from the image information acquired by the photographing unit.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE
PREFERRED EMBODIMENTS (Embodiment 1)

Figure 1:
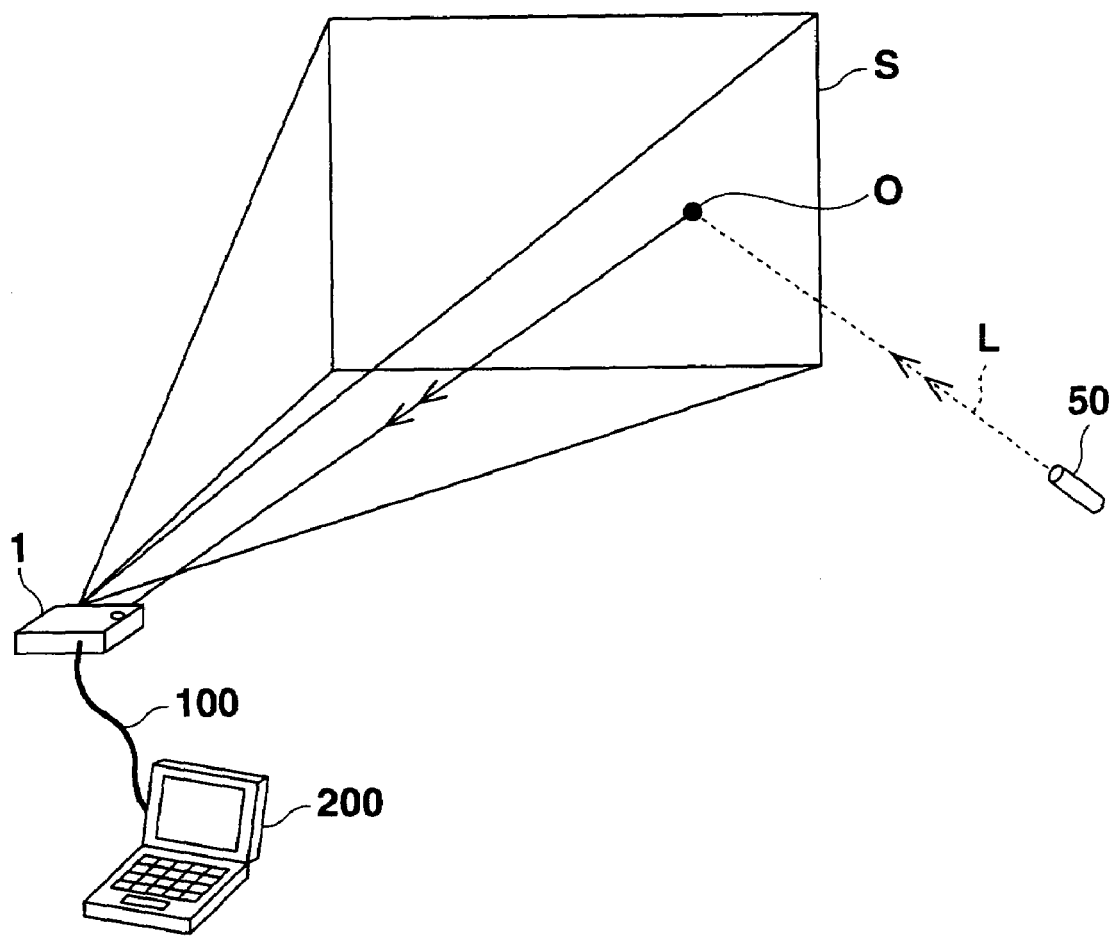
FIG. 1 is a diagram of a state of use of a projector showing an embodiment 1.

The embodiment 1 of the present invention will now be explained with reference to the drawings. FIG. 1 is a diagram showing a state of use of a projector 1 having a function as a pointed position detection device of the present invention.

The projector 1 comprises a DMD (Digital Micromirror Device) outlined in Description of the Related Art, and has a structure for projecting a color image on a screen S by the field sequential color method. The color image is made of color components of red (R), green (G), and blue (B) which are pre-designated. The projector 1 is connected to a personal computer 200 through a communication cable 100.

A laser pointer 50 is a pointer that emits a laser beam (pointing light) L.

Figure 2:
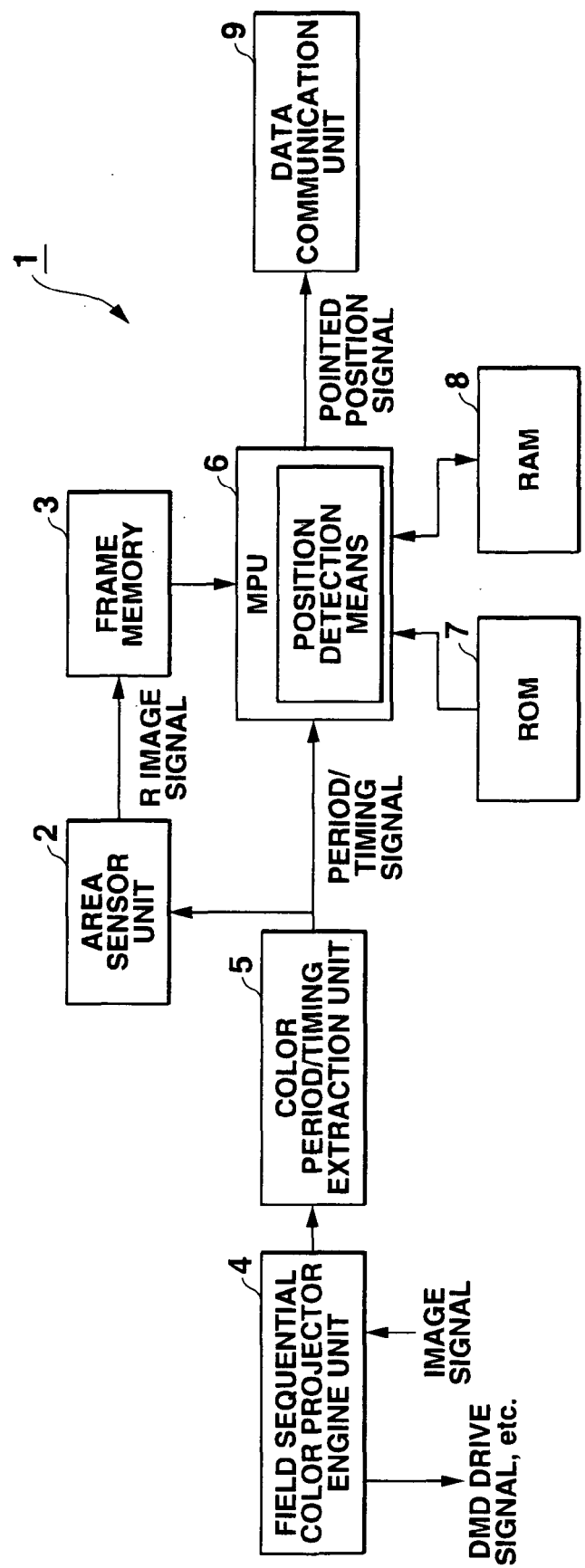
FIG. 2 is a block diagram showing a structure of the projector of the embodiment 1.

FIG. 2 is a block diagram showing principal parts of an electrical structure of the projector 1. The projector 1 comprises an area sensor unit 2, a frame memory 3, a field sequential color projector engine unit 4, a color period/timing extraction unit 5, an MPU 6, a ROM 7, a RAM 8, and a data communication unit 9.

Figure 3:
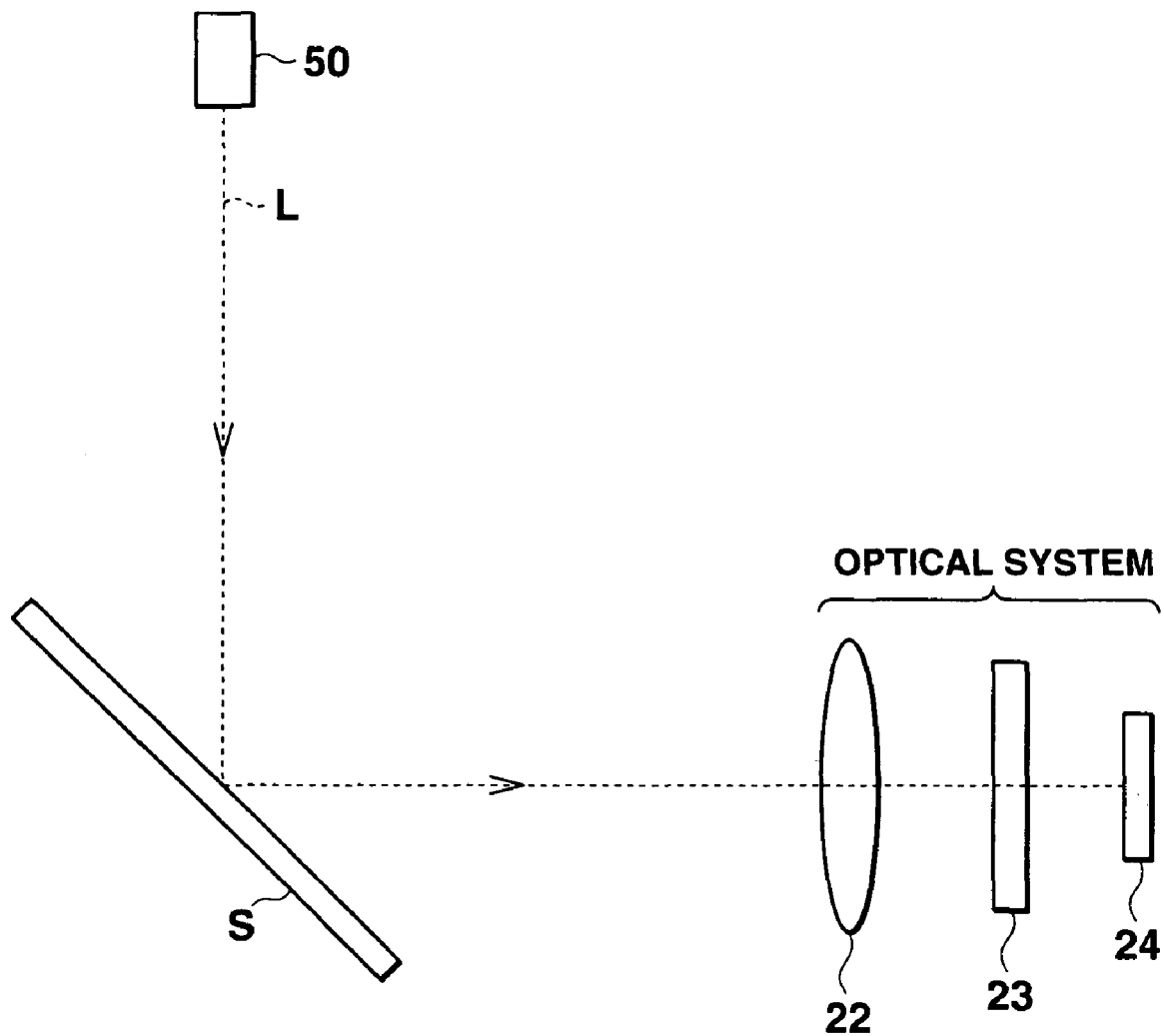
FIG. 3 is an exemplary diagram showing an optical system of an area sensor unit.

The area sensor unit 2 is a unit functioning as photographing means of the present invention, and comprises a lens 22, an optical filter 23, and an area sensor 24 which are shown in FIG. 3, and a drive circuit (not shown) and an A/D converter (not shown). Among these, the area sensor 24 acquires image information projected on the screen S through the lens 22 and the optical filter 23, and converts the acquired image information into an electrical image signal. The area sensor 24 is constituted by a CCD, etc. The optical filter 23 is a band pass filter that permits only a light having a specific color (a light within a specific frequency range) to permeate therethrough. In the present embodiment, the optical filter 23 permits permeation therethrough of only a red light having the same color as a laser beam (pointing light) L emitted from the laser pointer 50 which is used when the projector 1 is used. The frame memory 3 is a memory that stores image data which corresponds to one screen and is obtained based on an image signal sent from the area sensor unit 2. The MPU 6 reads out the image data stored in the frame memory 3 in accordance with necessity.

The field sequential color projector engine unit 4 outputs a DMD drive signal for driving the DMD, a rotation control signal for controlling rotation of the color wheel, etc., in response to an image signal transmitted from the personal computer 200. The color wheel serves to change a light from a light source coming to the DMD to a light of R, G, and B cyclically. Note that an image signal can be transmitted to the field sequential color projector engine unit 4 not only from the personal computer 200, but also from an arbitrary external apparatus connected to the projector 1.

The color period/timing extraction unit 5 is a unit for extracting the periods of different color components among a plurality of pre-designated color components included in a projected image, and extracts (sets) timings for projecting a red (R) image, a green (G) image, and a blue (B) image onto the screen S based on a DMD drive signal output from the field sequential color projector engine unit 4. The color period/timing extraction unit 5 outputs a period/timing signal representing the set projection timing to the area sensor unit 2 and the MPU 6.

The MPU 6 operates in accordance with a program stored in the ROM 7, controls the entire operation of the projector 1, and functions as position detection means (position detection unit). The ROM 7 stores a program for controlling the MPU 6 to perform a later-described operation and function as the position detection means of the present invention. The RAM 8 is a working memory of the MPU 6.

The data communication unit 9 has a connection terminal for the communication cable 100 shown in FIG. 1, and outputs and receives signals to and from the personal computer 200. The data communication unit 9 outputs a later-described pointed position signal sent from the MPU 6 to the personal computer 200 through the communication cable 100. The data communication unit 9 receives an image signal sent from the personal computer 200, and sends the received image signal to the field sequential color projector engine unit 4. The data communication unit 9 may be designed so as to perform transmission and reception of the pointed position signal and image signal through wireless communication (including infrared communication), or may be designed so as to perform only output of the pointed position signal through a cable or wireless communication.

Figure 4:
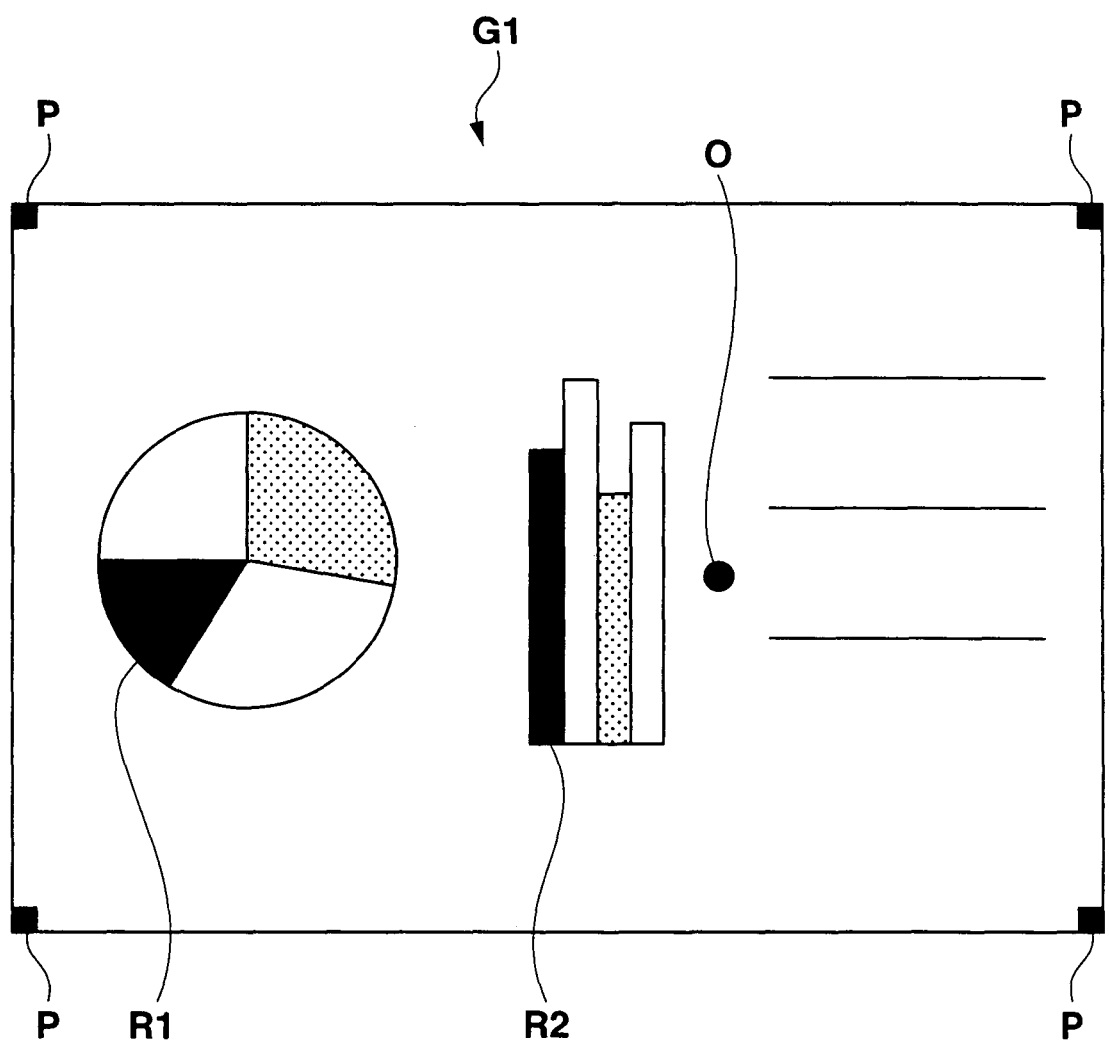
FIG. 4 is an explanatory diagram showing a projected image by the projector.

Next, an operation according to the present invention of the projector 1 will be explained. Here, it is assumed that application software for presentation is installed. This application software for presentation has a function for outputting image data representing a pre-created explanatory screen to the projector 1, and a function for receiving later-described pointed position information form the projector 1 and executing a predetermined operation based on the received pointed position information. It is further assumed that the personal computer 2 is activating this application program. It is further assumed that the projector 1 is projecting an explanatory image G1 such as shown in FIG. 4 on the screen S, based on an image (or video) signal sent from the personal computer 200. It is further assumed that a red optical image O of a laser beam L emitted from the laser pointer 50 is projected on the screen S. It is further assumed that there exist red (R) portions R1 and R2 in parts of the pie chart on the left and bar chart in the center in the explanatory image G1 as shown in FIG. 4, and the other parts are displayed in colors such as green (G) and blue (B).

Figure 5:
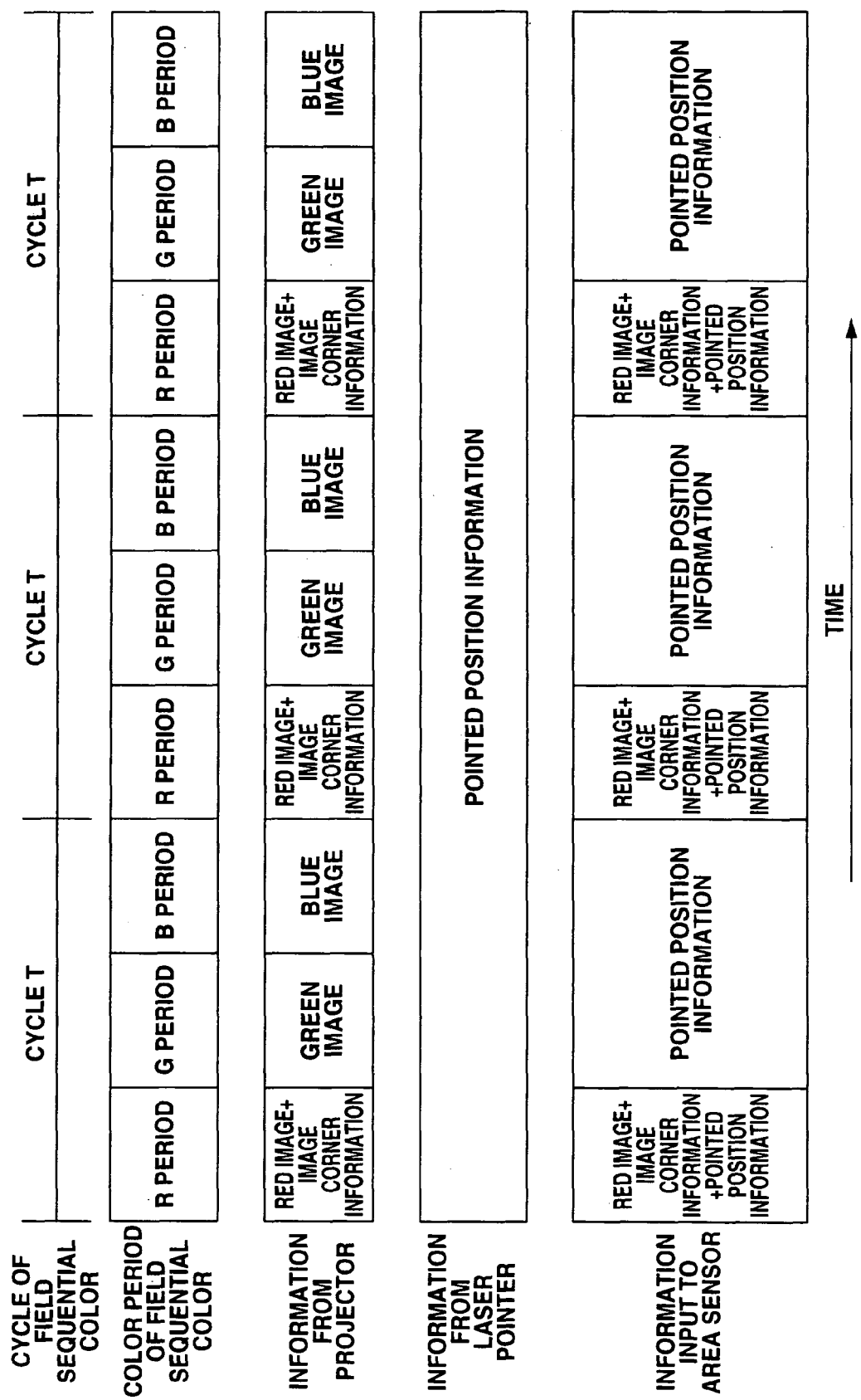
FIG. 5 is a timing chart showing timings for inputting two-dimensional information to be input to the area sensor unit of the embodiment 1.

The projector 1 automatically adds red dot images P onto the four vertexes of the explanatory image G1 as image corner information representing corners of the projected image, regardless of how the input image (or video) signal is, while it is projecting the explanatory image G1. During this time, the projector 1 projects a red image, a green image, and a blue image which are obtained by dividing the explanatory image G1 including the dot images P into each of color components R, G, and B on the screen S cyclically, in a cycle constituted by an R period, a G period, and a B period as shown in FIG. 5. The projector sets this cycle T to be smaller than 1/60, in order for a viewer not to perceive a flicker.

While the projector 1 is projecting the explanatory image G1, the laser pointer 50 continuously irradiates a laser beam L onto the screen S indifferently to the above cycle. That is, there exist on the screen S, a red image (information) and the image corner information in the R period, exists a green image in the G period, and exists a blue image in the B period. Further, there exists the pointed position information based on the optical image O of the laser beam L throughout all the periods.

Figure 6A:
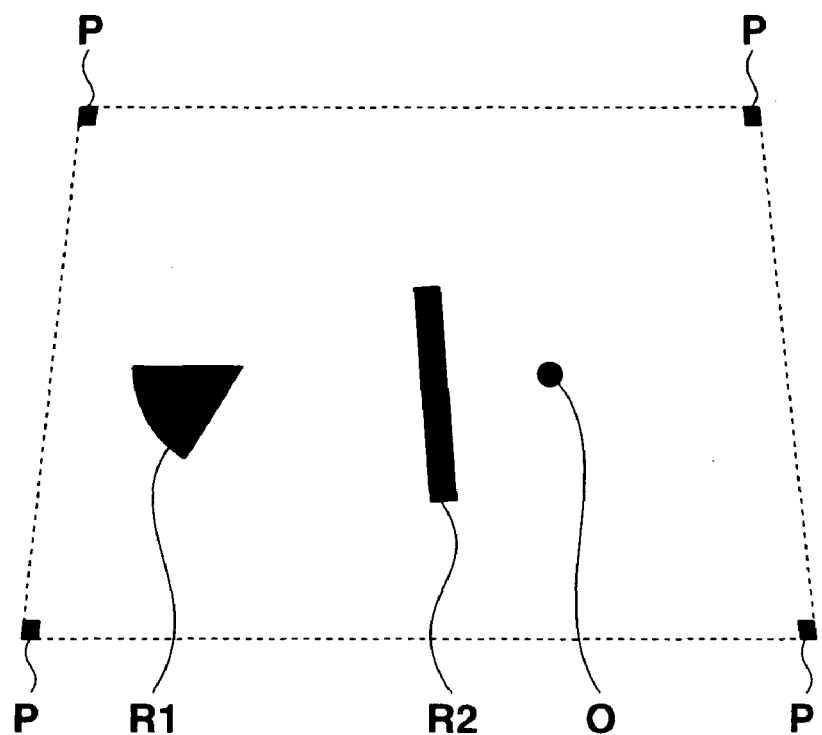
FIG. 6A is an explanatory diagram showing image information input to the area sensor unit in an R period.
Figure 6B:
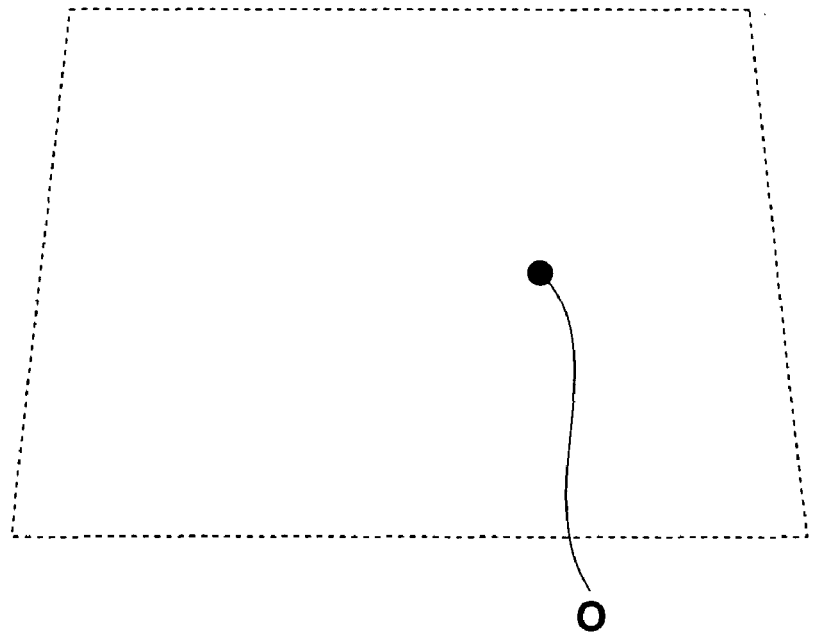
FIG. 6B is an explanatory diagram showing image information input to the area sensor unit in a G period and a B period.

On the other hand, the optical filter 23, which only permits a red light having the same color as the laser beam L to permeate, is inserted into the optical system of the area sensor unit 2, as described above. Accordingly, while the explanatory image G1 is projected, the area sensor 24 receives lights of the red image, the image corner information, and the pointed position information as two-dimensional information (image information) as shown in FIG. 6A in the R period. The area sensor 24 receives a light of only the pointed position information in the G period and the B period, as shown in FIG. 6B. The reason why the two-dimensional information shown in FIG. 6A or FIG. 6B is represented as a trapezoid tapered toward its top, is because the projector projects the two-dimensional information at an elevation angle.

Figure 7:
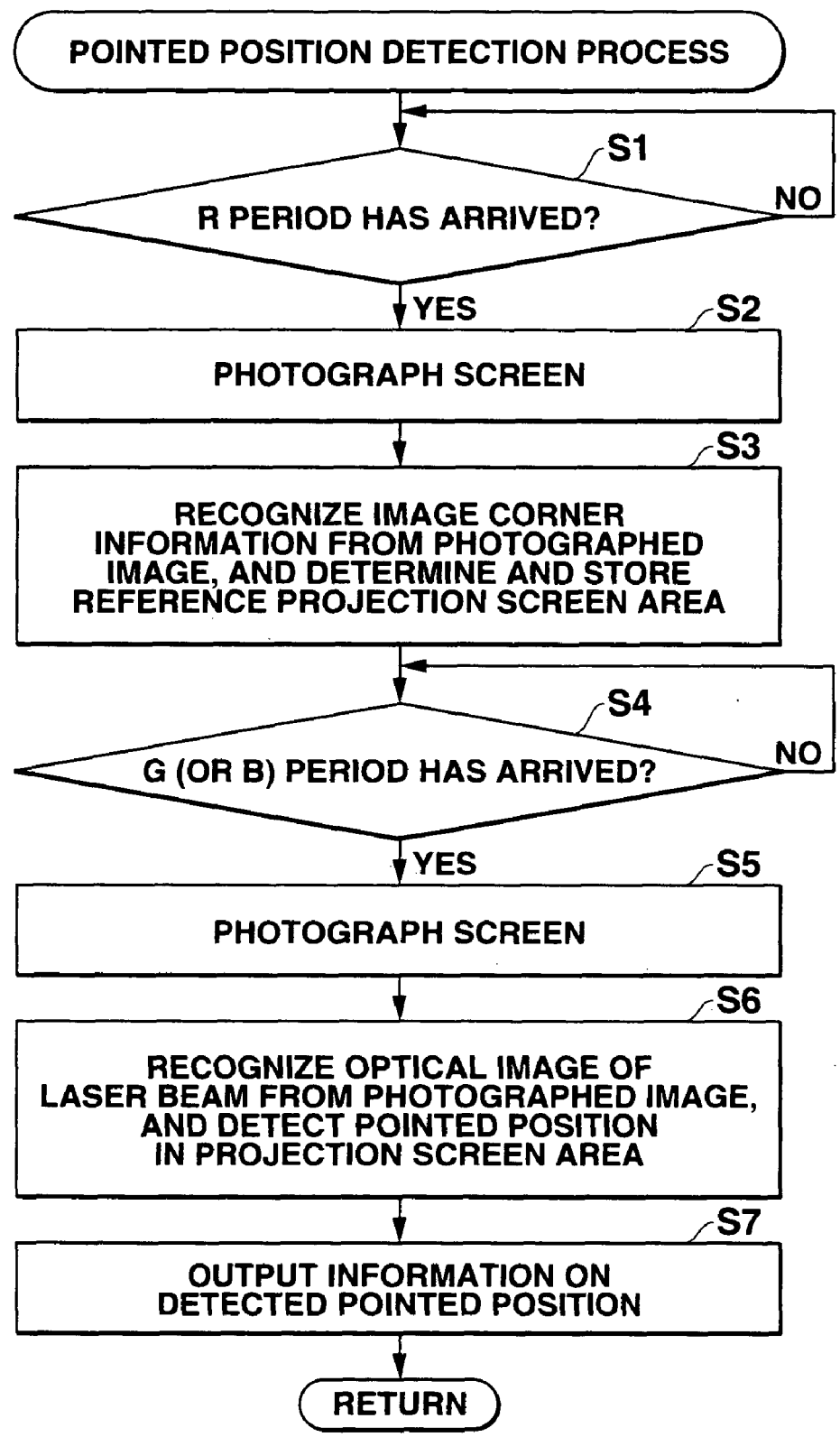
FIG. 7 is a flowchart showing a content of a pointed position detection process performed by an MPU of the embodiment 1.

While the explanatory image G1 is projected, the MPU 6 of the projector 1 executes a pointed position detection process shown in FIG. 7. That is, the MPU 6 determines whether or not an R period has arrived, based on a period/timing signal sent from the color period/timing extraction unit 5 (step S1). When determining that an R period has arrived (step S1, YES), the MPU 6 drives the area sensor 24, and the area sensor 24 converts the projected imaged on the screen S into an electrical image signal (step S2). Then, the MPU 6 applies predetermined image processing to the converted image, i.e. the image signal carrying the two-dimensional information shown in FIG. 6A, and determines a projection screen area that serves as a reference by recognizing the four dot images P (image corner information). Then, the MPU 6 stores information on the determined projection screen area in the RAM 8 (step S3).

Then, the MPU 6 determines whether or not a G period has arrived based on a period/timing signal sent from the color period/timing extraction unit 5 (step S4). When determining that a G period has arrived (step S4, YES), the MPU 6 drives the area sensor 24, and the area sensor 24 converts the projected image on the screen S into an electric image signal (step S5). The MPU 6 may perform this process when it determines that not a G period, but a B period has arrived. Then, the MPU 6 applies predetermined image processing to the light-received image, i.e. the image signal carrying the two-dimensional information shown in FIG. 6B, and recognizes the optical image O of the laser beam L. The MPU 6 recognizes the optical image O and detects its absolute position within the image. At the same time, the MPU 6 reads out the projection screen area information stored in step S3. The MPU 6 calculates the relative position of the position pointed by the laser pointer 50 with respect to the read-out projection screen area, as, for example, coordinate values in an X direction and a Y direction corresponding to the number of pixels in the explanatory image G1 sent from the personal computer 200 as image data (step S6). Then, the MPU 6 sends the calculation result to the personal computer 200 as information representing the detected pointed position (step S7). The MPU 6 repeats this process thereafter.

Due to this, the personal computer 200 performs a predetermined operation based on the received pointed position information. For example, if the position pointed by the laser pointer 50 exists within a predetermined area on the upper right of the explanatory image G1 for a predetermined period (several seconds), the personal computer 200 forwards a next page. And if the position pointed by the laser pointer 50 exists within a predetermined area on the upper left of the explanatory image G1 for a predetermined period (several seconds), the personal computer 200 returns a former page.

In the present embodiment, a case where the projector 1 projects a red (R) image, a green (G) image, and a blue (B) image cyclically, has been explained. However, the present invention is also effective in a case where the projector 1 employs a field sequential color method for cyclically projecting images of four colors including a while (W) image in addition to images of the above three colors. The pointed position detection process in this case is the same as that shown in FIG. 7.

As described above, according to the embodiment 1, in a case where the optical image O of the laser beam L emitted from the laser pointer 50 is red, the projector 1 detects the position within the image of the optical image O that is irradiated by the laser beam L in a period during which the projection light of the G image or the B image of the explanatory image G1 is projected on the screen S.

Accordingly, it becomes possible to easily detect only the optical image O of the laser beam L in the image projected on the screen S by the field sequential color method even if red portions are included, and to accurately detect the position within the projected image that is irradiated by a pointing light by a laser beam, etc.

(Embodiment 2)

A pointed position detection device according to the embodiment 2 of the present invention is designed so as to detect a position irradiated by a pointing light of a laser beam when a user gives an instruction.

Figure 9:
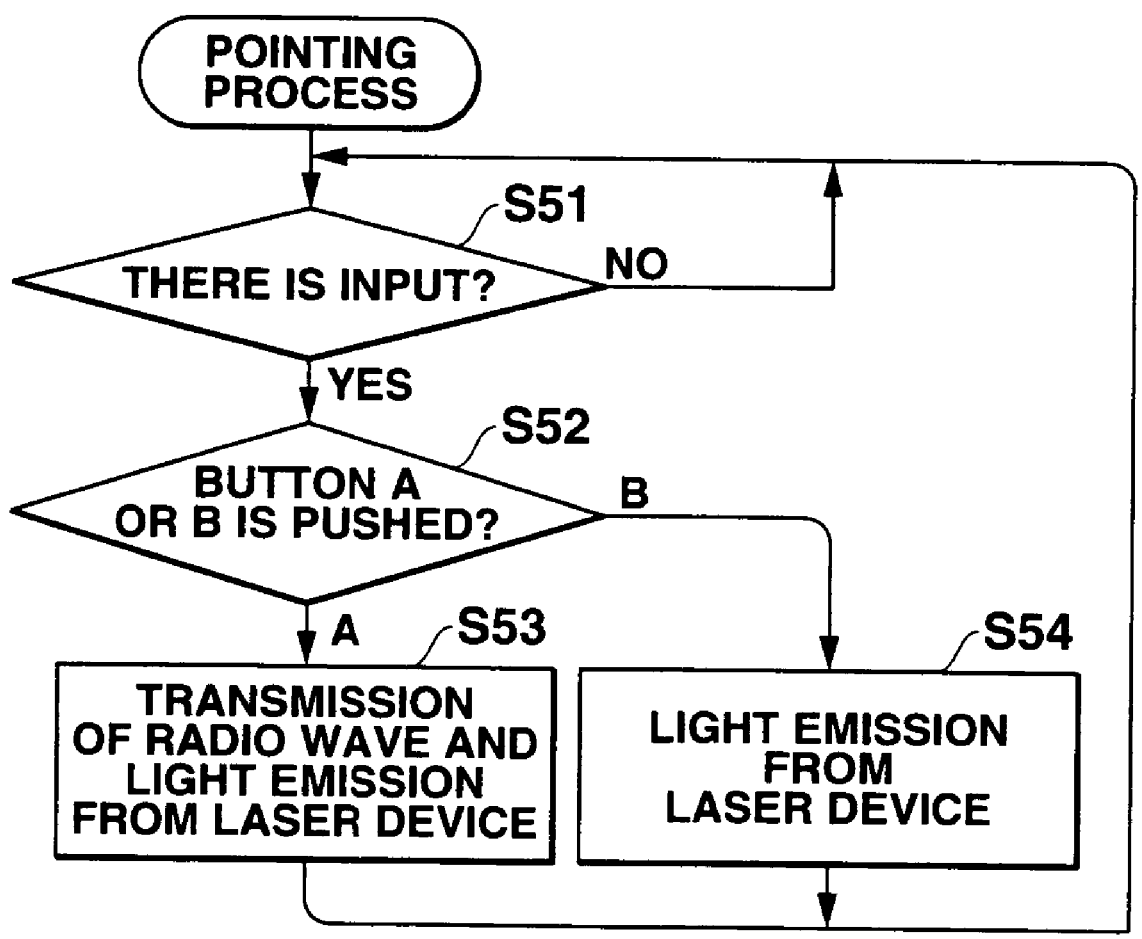
FIG. 9 is a flowchart showing a content of an operation performed by a laser pointer of the embodiment 2.
Figure 10:
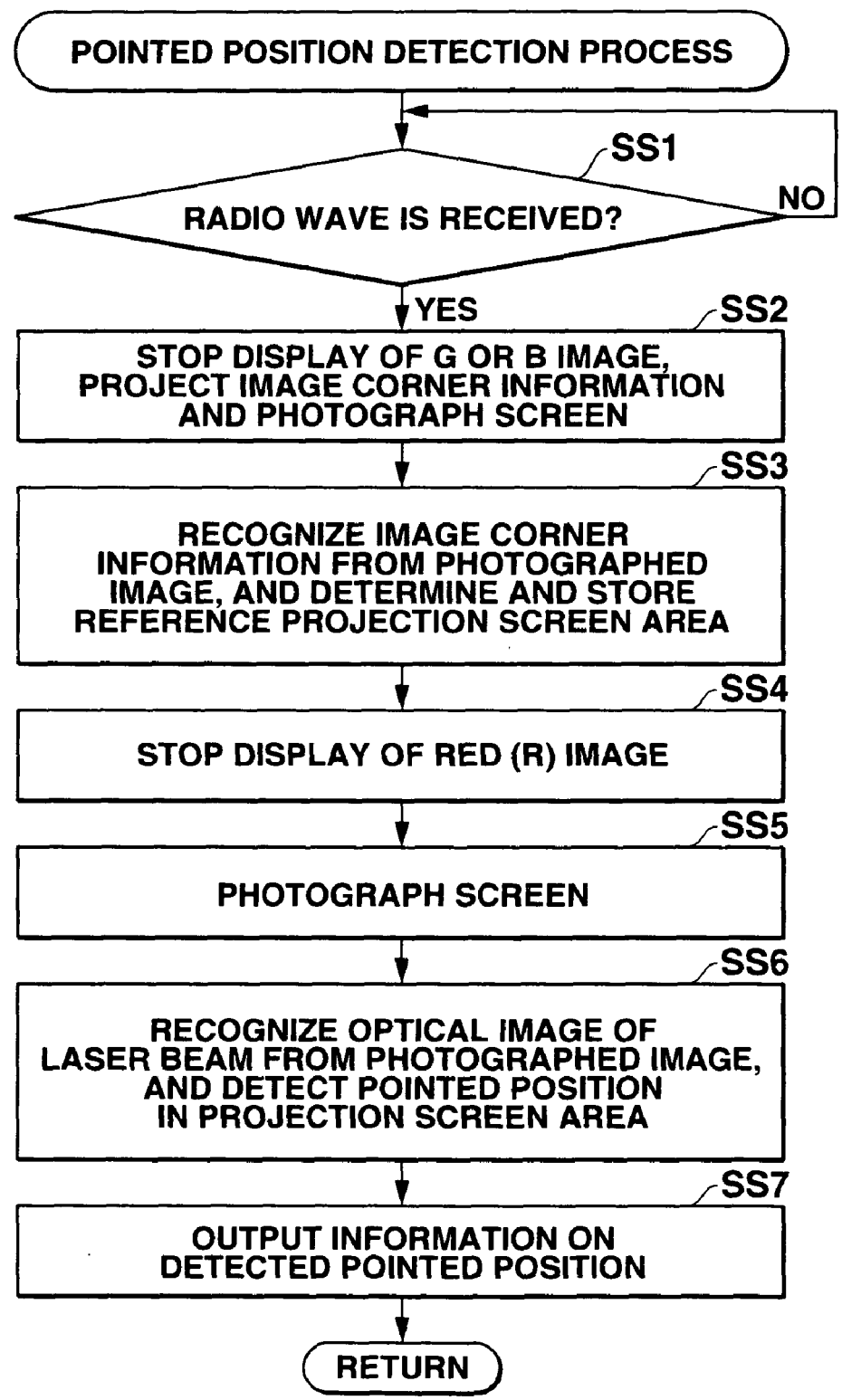
FIG. 10 is a flowchart showing a content of a pointed position detection process performed by an MPU of the embodiment 2.

As the embodiment 2 of the present invention, a projector which projects a red (R) image, a green (G) image, and a blue (B) image at the same time will be explained with reference to FIG. 8 to FIG. 10.

Figure 8:
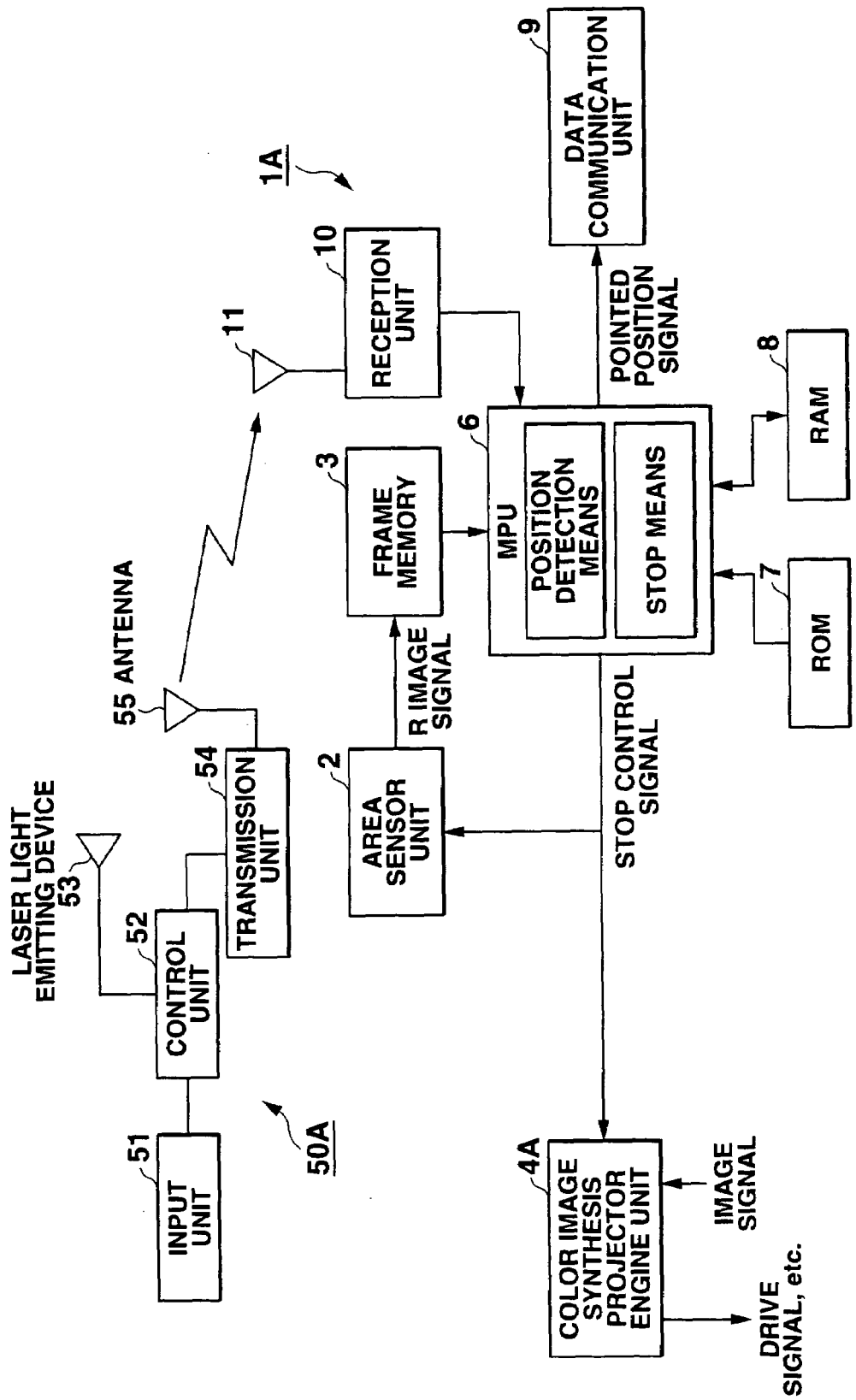
FIG. 8 is a block diagram showing a structure of a projector system showing an embodiment 2.

FIG. 8 is a block diagram showing principal parts of an electrical structure of a system constituted by a projector 1A according to the embodiment 2 of the present invention and a laser pointer 50A.

The projector 1A comprises an area sensor unit 2, a frame memory 3, a color image synthesis projector engine unit 4A, an MPU 6, a ROM 7, a RAM 8, and a data communication unit 9. The projector 1A comprises a radio reception unit 10, and a reception antenna 11 other than the above.

The laser pointer 50A comprises an input unit 51 having a plurality of keys, a control unit 52, a laser light emitting device 53, a transmission unit 54 for transmitting a radio signal, and a transmission antenna 55. The laser pointer 50A emits a laser beam L from the laser light emitting device 53 in accordance with an operation to the input unit 51 by a user. The transmission unit 54 transmits a radio signal.

The area sensor unit 2, the frame memory 3, and the data communication unit 9 have the same structures as those in the embodiment 1 described above.

The color image synthesis projector engine unit 4A outputs a drive signal for driving a liquid crystal display panel and three DMDs, in response to an image signal sent from a personal computer 200 (or a video signal sent from an arbitrary external device connected to the projector 1, other than the personal computer 200). The liquid crystal display panel is one that is constituted by one panel that creates a full-color image, or one that creates a red (R) image, a green (G) image, and a blue (B) image.

The MPU 6 operates in accordance with a program stored in the ROM 7, and controls the entire operation of the projector 1A. Further, the MPU 6 functions as stop means (stop unit) for stopping display of an image having a specific color, and position detection means (position detection unit) for detecting a pointed position of the pointer. The ROM 7 stores a program for controlling the MPU 6 to perform a later-described operation and function as the position detection means of the present invention. The RAM 8 is a working memory of the MPU 6.

An operation according to the present invention of the projector 1A will now be explained. Here, it is assumed that application software for presentation is installed in the personal computer 200. The application software for presentation has a function for outputting image data representing a pre-created explanatory screen to the projector 1A, and a function for receiving later-described pointed position information from the projector 1A and performing a predetermined operation based on the received pointed position information. It is assumed that the personal computer 200 is activating the application software for presentation.

Further, it is assumed that the projector 1A is projecting an explanatory image G1 such as shown in FIG. 4 in the embodiment 1, based on the an image (or video) signal sent from the personal computer 200. However, it is assumed that the projector 1A does not project red dot images P as image corner information, and that a red optical image O of the laser beam L emitted from the laser pointer 50A does not yet exist.

Operations of the laser pointer 50A and projector 1A when a user operates the input unit 51 of the laser pointer 50A, will now be explained with reference to FIG. 9, and FIG. 10, respectively.

First, the control unit 52 detects whether there is an operation by a user to the input unit 51 (step S51). In a case where there is an operation by a user to the input unit 51 (step S51, YES), the control unit 52 waits for a button A or B to be pushed. The A key is a key for instructing irradiation of the laser beam L and transmission of a radio signal. The B key is a key for instructing only irradiation of the laser beam L.

The control unit 52 determines whether the A key is pushed or the B key is pushed (step S52). In a case where determining that the A key is pushed (step S52, A), the control unit 52 performs irradiation of the laser beam L and transmission of a radio signal (step S53). In a case where determining that the B key is pushed, the control unit 52 irradiates the laser beam L and finishes its process.

On the other hand, the projector 1A determines whether or not it has received a radio signal from the laser pointer 50A (step SS1). In a case where determining that a radio signal has been received (step SS1, YES), the projector 1A stops display of a green (G) image and a blue (B) image. Then, the projector 1A projects red dot images P as image corner information, and drives the area sensor 24 to receive a reflection light of the image projected on the screen S (step SS2). The projector 1A performs predetermined image processing based on an image of the received reflection light, i.e. the image of the two-dimensional information shown in FIG. 6A. The projector 1A determines a reference projection screen area by performing image processing and recognizing the four dot images P (image corner information). The projector 1A stores information on the determined projection screen area in the RAM 8 (step SS3).

Then, the MPU 6 sends a stop control signal to the color image synthesis projector engine unit 4A, and stops display of the red (R) image carried by the input image (or video) signal (step SS4). The MPU 6 drives the area sensor 24 synchronously with the stopping of the display of the red (R) image, and receives a reflection light from the screen S. After this photographing is finished, the MPU 6 sends a stop control signal to the color image synthesis projector engine unit 4A, and resumes display of a red (R) image (step SS5).

Then, the MPU 6 performs predetermined image processing based on the image photographed just now, i.e. the image of the two-dimensional information shown in FIG. 6B. The MPU 6 recognizes the optical image O of the laser beam L by performing image processing, and once detects the position (absolute position) of the optical image O within the image. At the same time, the MPU 6 reads out the projection screen area information stored in step SS3. The MPU 6 calculates a position (relative position) of he optical image O with respect to the read-out projection screen area, as the position pointed by the laser pointer 50A (step SS6). This pointed position is represented as coordinate values in an X direction and a Y direction corresponding to the number of pixels in the explanatory image G1 sent from the personal computer 200 as image data. The, the MPU 6 sends the calculation result to the personal computer 200 as information representing the detected pointed position (step SS7). The MPU 6 repeats this process thereafter.

In the present embodiment, a period required by the area sensor 24 to perform photographing, that is, equal to or less than $\frac{1}{60}$ of a second is sufficient as the period during which display of the red (R) image is stopped. The MPU 6 synchronizes the photographing timing of the area sensor 24 and the period during which display of the red (R) image is stopped with each other. Because of this, it is possible not to make a viewer perceive a flicker even though display of the red (R) image is stopped on the projection screen.

As described above, according to the embodiment 2, the position irradiated by a pointing light of a laser beam is detected when there is an instruction from the user. Accordingly, it is possible to detect the irradiated position in accordance with necessity, and to accurately detect the position irradiated by a pointing light of a laser beam, etc. in an image projected on a screen by a color image synthesis method.

In each of the embodiments described above, the optical filter 23 for permitting only a red light having the same color as the laser beam L to permeate is prepared in the optical system of the area sensor unit 2, and the projector 1 performs detection of a pointed position by using the two-dimensional information shown in FIG. 6B, that is, an image in which no other image than the optical image O of the laser beam L exists. Therefore, even if there exist the red portions R1 and R2 having the same color as the laser beam L in the projected image (explanatory image G1), it is possible to accurately detect the pointed position. Furthermore, it is possible to easily perform detection of a pointed position without using a complicated image processing technique, and to lighten the burden that is imposed on the MPU 6 when detecting a pointed position.

In each embodiment, a projector in which the optical filter 23 is prepared in the optical system of the area sensor unit 2, has been shown. However, the optical filter 23 may be omitted. In that case, the image whose refection light is received in step SS5 described above is an image in which, other than the optical image O of the laser beam L, there is no image that has the same color as the laser beam L. Therefore, even if there is an image other than the optical image O in the photographed imaged, it is possible to detect the position of the optical image O (the position pointed by the laser beam L) by an image processing technique. Accordingly, even with a structure from which the optical filter 23 is omitted, it is possible to detect a pointed position accurately. However, in this case, the image processing technique to be used will become slightly complicated.

Further, the optical filter 23 may be omitted, and at the same time, the following process may be performed in the above-described pointed position detection process. For example, the MPU 6 may be designed so as to perform a filtering process after a reflection light from the screen S is received in step SS5 in order to extract image data representing only red (R) components from the image of the received reflection light, and to obtain two-dimensional information similar to that shown in FIG. 6B. That is, the projector 1 may be structured so as to comprise a digital filter in place of the optical filter 23.

Further, in each embodiment, when performing the pointed position detection process, the MPU 6 confirms the projection screen are that serves as a reference each time the MPU 6 repeats this process, and decides on a relative position with respect to this projection screen area to be pointed position information that is to be detected and eventually sent to the personal computer 200. Therefore, even in a case where the projection magnification (the size of the projected image) is changed, the MPU 6 can accurately detect the position pointed by the laser beam L.

The MPU 6 may perform a process which is based on a premise that the projection magnification of the projector 1 will not be changed. For example, before a presentation is started, the projector 1 projects an arbitrary image (it may be the explanatory image G1) with the image corner information (dot images P) added to its vertexes, or an image with only the image corner information, in order to set a projection screen area. Then, the MPU 6 determines a projection screen area based on the projected image, and stores information on the determined projection screen area in the RAM 8. The MPU 6 may perform such a process for setting a projection screen area, and thereafter may perform the pointed position detection process from which steps S1 to S3 (SS1 to SS3) described above are omitted.

Figure 11:
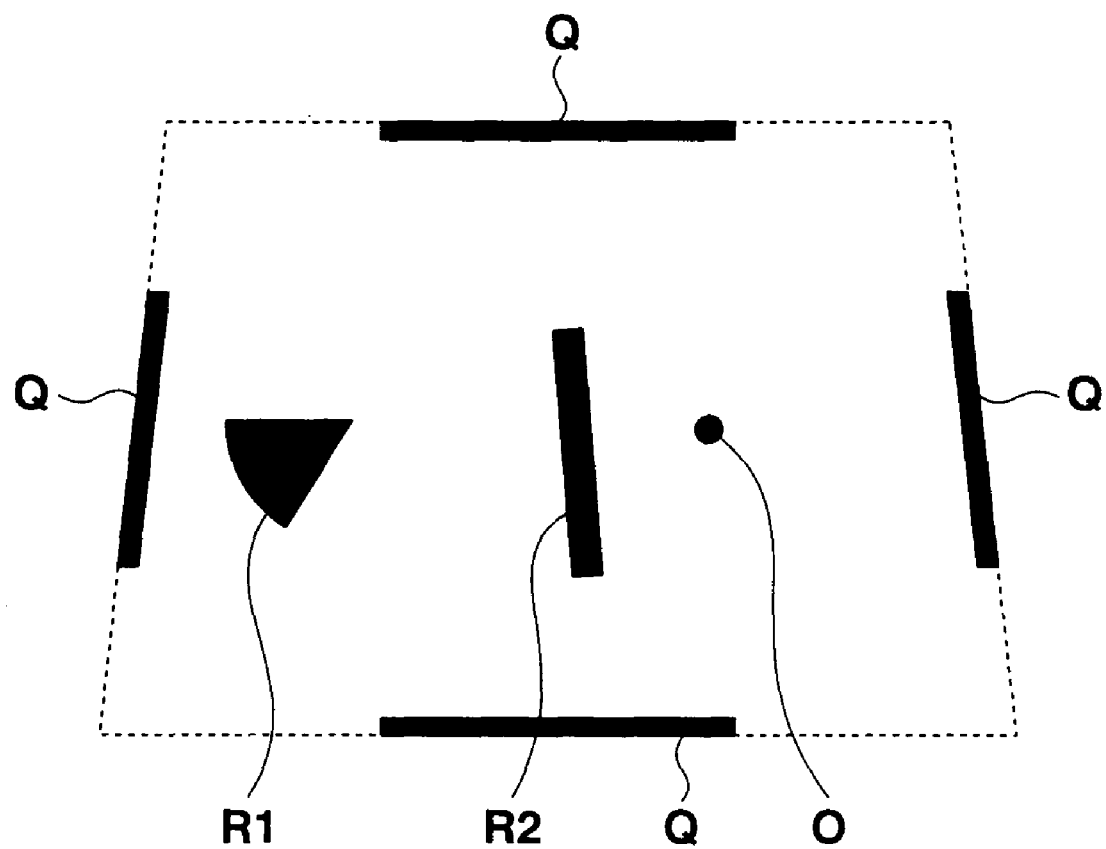
FIG. 11 is an explanatory diagram corresponding to FIG. 6A when image corner information is changed to line images.

Further, it has been explained that the dot images P, which are the image corner information indicating the corners of a projected image, are red. The color of the dot images P may be yellow or white as long as it includes the red color. Further, the color of the dot images P may be any color if the projector 1 has the structure which does not include the optical filter 23 as described above. Further, the image corner information representing the corners of a projected image may not be information representing the vertexes of the projected image, but may be replaced with information representing line images Q each representing any of the four sides of the projected image, as shown in FIG. 11. Note that in the case where such line images Q are used, their color is the same as the color of the dot images P.

In each embodiment, a structure for detecting a position pointed by the laser pointer 50 which emits a red laser beam L, has been explained. However, the projector 1 may be designed so as to detect a position pointed by the laser pointer 50 which emits a green (G) laser beam L. In this case, an optical filter which permits only a green light to permeate therethrough needs to be used as the optical filter 23, and the dot images P to be added to the four vertexes of the explanatory image G1 need to be green. Along with this, in the pointed position detection process in the embodiment 1, the MPU 6 needs to obtain information on the projection screen area based on an image at the time when a G period has arrived, and to detect pointed position information based on an image at the time when a B (or R) period has arrived. In the pointed position detection process in the embodiment 2, the MPU 6 needs to detect pointed position information based on an image acquired when display of a green (G) image is stopped.

Furthermore, in a case where a digital filter is used instead of the optical filter 23, the projector 1 may be designed so as to allow a user to set the color of the laser beam L in advance, and to perform the filtering process and the pointed position detection process in accordance with the set color. With such a design, the projector 1 becomes able to perform the above-described processes suitably for a plurality of colors that the laser beam L may be changed to.

In the above-described embodiments, a case where the projector 1 projects an image sent from the personal computer 200 on the screen S, has mainly been explained. However, the projector 1 may be structured so as to have a throttle for a detachable memory card (the standard of the memory card is arbitrary), and to project an explanatory image based on image data stored in the attached memory card. In this case, there is no need of outputting information on a position detected in the pointed position detection process to outside. Further, in a case where the projector 1 is designed so as to project only an explanatory image based on image data stored in the memory card, the data communication unit 9 shown in FIG. 2 becomes unnecessary.

Further, in the embodiments of the present invention, a structure in which the pointed position detection device of the present invention is incorporated into the projector 1, has been shown. However, the pointed position detection device may be structured as a device separate from the projector 1. In this case, the projector 1 is structured so as to be sent thereto the DMD drive signal described above and to extract timings for projecting an R image, a G image, and a B image on the screen S based on the sent DMD drive signal. Or, the projector 1 may be structured such hat the area sensor 24 sequentially detects images in a shorter cycle than the R period, G period and B period shown in FIG. 5, and detects the projection timings by checking information on the colors of the detected images. Furthermore, the pointed position detection device of the present invention may be constituted by a personal computer and a general-purpose CCD camera connected to the personal computer. In this case, the personal computer is structured so as to perform the pointed position detection process. In this case, the band pass filter according to the present invention will be the digital filter described above.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2002-252219 filed on Aug. 30, 2002 and No. 2003-

291252 filed on Aug. 11, 2003 and including specification, claims, drawings and summary. The disclosure of the above Japanese Patent Applications is incorporated herein by reference in its entirety.

What is claimed is:

1. A pointed position detection device which detects a position irradiated by a pointing light of a pointing device for specifying a position on a screen by the pointing light, said detection device comprising;

a timing extraction unit which extracts timings of projection periods during which respective images of each of a plurality of pre-designated color components included in a projected image are projected;

a photographing unit which photographs said screen to obtain a first image during a first projection period in which a projection image including only a color component different in color from the pointing light is projected, and which photographs said screen to obtain a second image during a second projection period in which a projection image including a color component of a same color as the pointing light is projected, based on the timings extracted by said timing extraction unit; and a position detection unit which detects the position irradiated by the pointing light from the first and second images photographed by said photographing unit.

2. The pointed position detection device according to claim 1, wherein the projection image including the color component of the same color as the pointing light includes image corner information respresents corners of the projected image.

3. The pointed position detection device according to claim 1, wherein the projection image including the color component of the same color as the pointing light includes image corner information represents sides of the projected image.

4. The pointed position detection device according to claim 1, wherein said photographing unit comprises a band pass filter which acquires an image of only the color component of the same color as the pointing light.

5. The pointed position detection device according to claim 1, wherein said timing extraction unit obtains information on a drive timing from a projector engine unit which generates the drive timing for driving an optical modulator for embedding an image signal in an optical signal, and extracts a projection period for each color component.

6. The pointed position detection device according to claim 1, wherein said pointing device irradiates a laser light.

7. A method of detecting a position irradiated by a pointing light of a pointing device for specifying a position on a screen, said method comprising:

extracting timings of projection periods during which respective images of a plurality of pre-designated color components included in a projected image are projected;

photographing said screen to obtain a first image during a first protection period in which a protection image including only a color component different in color from the pointing light is projected, based on a timing extracted in said timing extracting step;

photographing said screen to obtain a second image during a second projection period in which a projection image including a color component of a same color as the pointing light is projected; and detecting the position irradiated by the pointing light of said pointing device from the first and second photographed image.

8. A pointed position detection system including a pointing device for irradiating a pointing light onto a screen and pointing a position on a screen by the irradaited pointing light, and a pointed position detection unit for detecting the position pointed by the pointing light of said pointing device, wherein:

said pointing device comprises:

a light emitting element which emits a pointing light; and a transmission unit which transmits a radio signal synchronously with light emission of said light emitting element, and said pointed position detection unit comprises:

a reception unit which receives the radio signal from said transmission unit of said pointing device;

a stop unit which stops projection of an image having a specific color, in response to the radio signal received by said reception unit;

a photographing unit which receives a light of an image projected together with the pointing light on said screen and acquires image information of the projected image, in a period during which said stop unit stops projection of the image having the specific color; and a position detection unit which detects the position irradiated by the pointing light, from the image information acquired by said photographing unit.

9. The pointed position detection system according to claim 8, wherein:

said photographing unit further acquires image information of a projected image including image corner information representing corners of the projected image; and said position detection unit detects the position irradiated by the pointing light, based on the pointing light and the image corner information.

10. The pointed position detection system according to claim 9, wherein the image corner information represents of corners of the projected image.

11. The pointed position detection system according to claim 10, wherein the image corner information represents sides of the projected image.

12. The pointed position detection system according to claim 8, wherein said photographing unit comprises a band pass filter which acquires an image of only a color component having a same color the pointing light.

13. The pointed position detection system according to claim 8, wherein said stop unit sends a stop signal to a projector engine which controls driving of an optical modulator.

14. The pointed position detection system according to claim 8, wherein said pointing device irradiates a laser light.

* * * * *